United States Patent
Balb (10) Patent No.: US 8,042,023 B2
(45) Date of Patent: Oct. 18, 2011

(54) MEMORY SYSTEM WITH CYCLIC REDUNDANCY CHECK

(75) Inventor: Markus Balb, Unterhaching (DE)

(73) Assignee: Qimonda AG, Munich (DE)

( * ) Notice: Subject to any disclaimer, the term of this patent is extended or adjusted under 35 U.S.C. 154(b) by 948 days.

(21) Appl. No.: 12/013,832

(22) Filed: Jan. 14, 2008

(65) Prior Publication Data
US 2009/0183051 A1 Jul. 16, 2009

(51) Int. Cl.
*G11C 29/00* (2006.01)
(52) U.S. Cl. .......................... 714/768; 714/758
(58) Field of Classification Search .................. 713/180; 714/718, 763, 764, 746, 768, 758
See application file for complete search history.

(56) References Cited

U.S. PATENT DOCUMENTS

| | | | | |
|---|---|---|---|---|
| 7,076,715 B2* | 7/2006 | Gibart | | 714/746 |
| 7,200,770 B2* | 4/2007 | Hartwell et al. | | 714/6.32 |
| 7,203,890 B1* | 4/2007 | Normoyle | | 714/768 |
| 2001/0049789 A1* | 12/2001 | Schmid | | 713/180 |
| 2009/0235113 A1* | 9/2009 | Shaeffer et al. | | 714/5 |

* cited by examiner

*Primary Examiner* — David Ton
(74) *Attorney, Agent, or Firm* — Edell, Shapiro & Finnan, LLC (57) ABSTRACT

A memory system, with a memory controller and a memory module, is configured to transfer error securing data and address signals within signal frames between the memory controller and the memory module. The memory system includes: an address register configured to pre-store an address signal associated with at least one block of data signals to be transferred, and at least one cyclic redundancy checksum calculator included in one of the memory controller and the memory module, the calculators being configured to calculate a cyclic redundancy checksum for the at least one data signal block, wherein the pre-stored address signal is used as an initial value for the calculation of the cyclic redundancy checksum and the at least one block of data and address signals are transferred together with the calculated cyclic redundancy checksum.

35 Claims, 6 Drawing Sheets

MEMORY SYSTEM WITH CYCLIC REDUNDANCY CHECK

BACKGROUND

For detecting transmission errors occurring on high speed signal lines, a standard for future graphic memory systems (e.g., the Graphic Double Data Rate 5 (GDDR5) standard) envisages an error detection on the data bus to improve system reliability. As graphics systems store more and more code in the DRAM, effective error detection becomes essential, as random bit fails associated with any high speed data transmission would lead to unacceptable system failures.

In the GDDR5 standard, the transmitted data is secured using a CRC (cyclic redundancy check) with an algorithm that is well established within high quality communication environments like ATM networks. The algorithm enables a detection of most errors with 100% probability. Error detection can be used to trigger retraining of the data transmission line which allows the system to dynamically adapt to changing conditions (e.g., temperature or voltage drift).

Until now, such memory systems have not provided the ability to detect errors in the transmitted addresses without using an additional pin at the controller module and/or the memory module. Such an additional pin can be used for transmitting a so-called parity bit which can be used for detecting an error in the transmitted address. However the additional pin at the controller module and/or the memory module disadvantageously increases the pin count as well as the power consumption at the controller module and/or the memory module.

It is therefore desirable to achieve improved error detection by means of a cyclic redundancy check when data and addresses are transferred between a memory and a controller which also allows recognition of an error in the transferred address.

SUMMARY

A memory system, with a memory controller and a memory module, is configured to transfer error securing data and address signals within signal frames between the memory controller and the memory module. The memory system includes: an address register configured to pre-store an address signal associated with at least one block of data signals to be transferred, and at least one cyclic redundancy checksum calculator included in one of the memory controller and the memory module, the calculators being configured to calculate a cyclic redundancy checksum for the at least one data signal block, wherein the pre-stored address signal is used as an initial value for the calculation of the cyclic redundancy checksum and the at least one block of data and address signals are transferred together with the calculated cyclic redundancy checksum.

The above and still further features and advantages of the present invention will become apparent upon consideration of the following definitions, descriptions and descriptive figures of specific embodiments thereof, wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The invention is explained in more detail below with reference to accompanying drawings, where.

DETAILED DESCRIPTION

Figure 1:
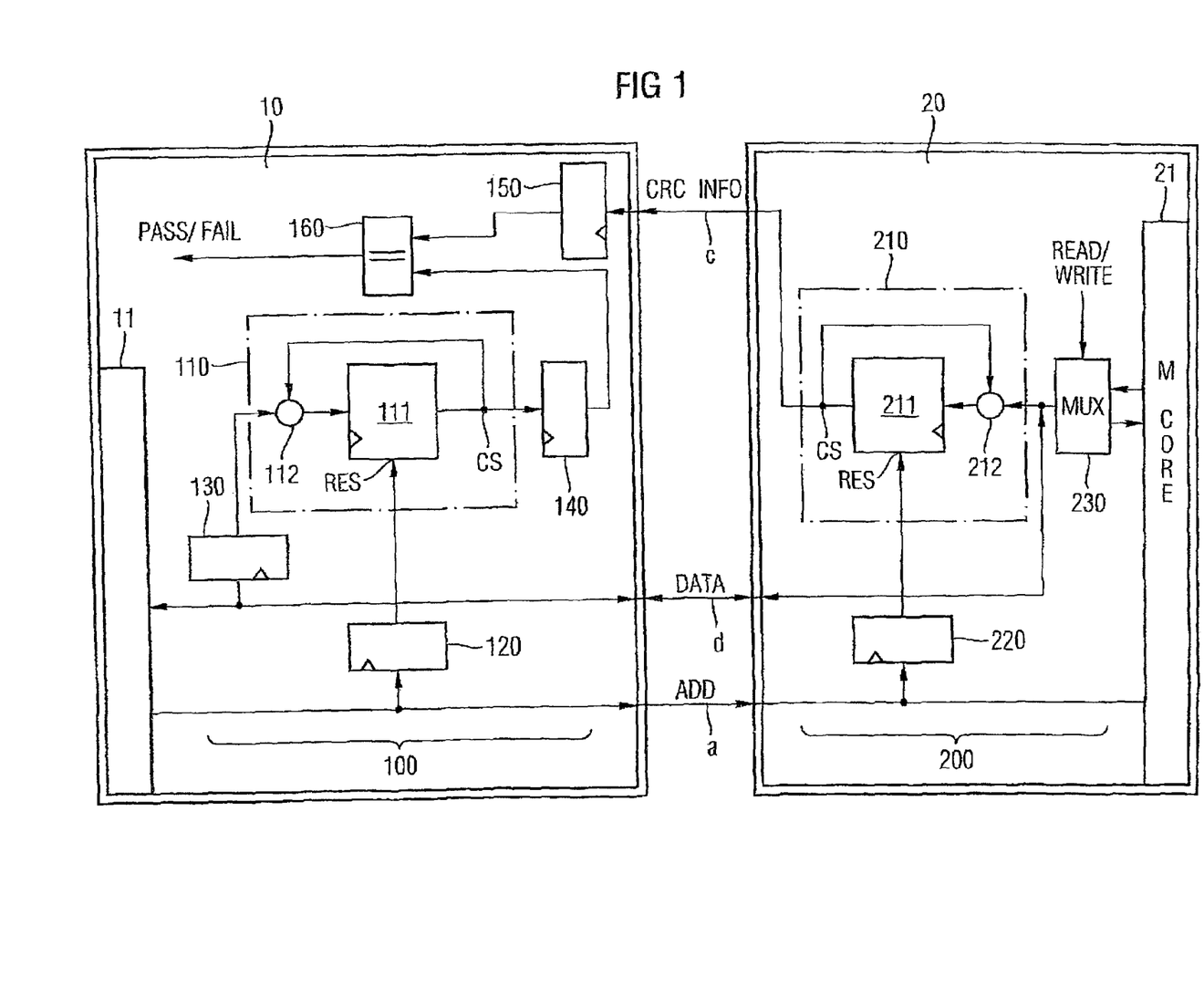
FIG. 1 shows schematically a functional block diagram of an embodiment of a memory system embodying a CRC calculator in a memory controller module and a memory module.

According to the embodiment depicted in FIG. 1, a memory system according to one embodiment comprises a memory controller 10 and a memory module 20. The memory controller 10 and the memory module 20 includes a cyclic redundancy check (CRC) calculator 100, 200 configured to calculate a CRC error recognition checksum for at least one block of data and address signals to be transferred within at least one signal frame between the memory controller 10 and the memory module 20. The CRC calculator 100, 200 includes: an address register 120, 220 configured to pre-store an address signal ADD associated to a corresponding at least one block of data signals to be transferred, and a CRC generator 110, 210 being configured to calculate the CRC error recognition checksum upon being initiated by the pre-stored address signal ADD.

The memory controller 10 sends blocks of write data signals to and receives blocks of read data signals DATA from the memory module 20 through data signal lines d. The memory controller 10 further sends address signal blocks ADD to the memory module 20 through address signal lines a and receives from the memory module 20 a CRC information signal CRC_INFO through CRC_INFO signal lines c.

To achieve a high speed transmission between the memory controller 10 and the memory module 20 blocks of data signals and address signals are transmitted as signal frames in accordance with a predefined transmission protocol, wherein a specific address ADD is assigned to a corresponding data block and this address and the corresponding data block may be included in one signal frame.

The functional block diagram in FIG. 1 further depicts that the memory controller 10 includes a control/processing unit 11 and the CRC calculator 100 and that the memory module 20 includes a memory core (MCORE) 21 and the CRC calculator 200. The CRC calculator 100 in the memory controller 10 as well as the CRC calculator 200 in the memory module 20 are configured to calculate the CRC error recognition checksum for one block of data and address signals to be transferred within at least one signal frame between the memory controller 10 and the memory module 20.

The CRC generator 110 in the memory controller 10 comprises a calculator-register 111 and an arithmetic unit 112 which effectively may be an adder. Further, the address register 120 is connected to the address transmission lines a and configured to pre-store an address signal ADD associated to a corresponding write or read data block DATA and a data input register 130 for storing a data signal block corresponding to the address signal pre-stored in the address register 120, the data signal block being input to the CRC generator 110.

The CRC generator 110 is configured to calculate a CRC error recognition checksum CS upon being initiated by the address signal pre-stored in the address register 120. There to the address signal pre-stored in the address register 120 is supplied to a reset input interface RES (i.e., initial value setting unit) at the CRC generator 110. That is to say, the calculator register 111 is preset by the address value pre-stored in the address register 120. The CRC error recognition checksum CS generated by the CRC generator 110 is output to and temporarily stored in a CRC output register 140 and from there supplied to a comparator 160 for comparing it with the reference CRC checksum CRC_INFO received from the memory module 20 and temporarily registered in a CRC info buffer 150, the CRC_INFO signal having the function of a reference CRC checksum. The comparator 160 outputs a pass/fail signal PASS/FAIL in accordance with the result of comparison of the CRC error recognition checksum CS generated by the CRC generator 110 and the reference CRC checksum CRC_INFO temporarily stored in the CRC info buffer 150.

The CRC scheme may be implemented on a per byte basis securing all address lines a and data lines d. When the memory controller 10 depicts an error, that is when the comparator 160 outputs a fail signal, the command that causes the error can be repeated. This error detection scheme advantageously can be used to trigger retraining of the data transmission line which allows the system to dynamically adapt to changing conditions like temperature and voltage drifts.

Similar to the memory controller 10 the CRC calculator 200 of the memory module 20 comprises a CRC generator 210 including a calculator register 211 and an arithmetic unit 212 for calculating and outputting a CRC error recognition checksum which in the present memory system is transferred as the reference CRC information CRC_INFO to the memory controller 10 through the CRC information lines c. The CRC calculator 200 also includes an address register 220 configured to pre-store an address signal which is associated to a corresponding data signal or data block DATA which at that moment is input as write data to the memory module 20 or output as read data from the memory module 20.

Further the memory module 20 includes a multiplexing register (MUX) 230 controlled by a read/write control signal which, the MUX 230 being used by the CRC calculator 200 as a data input register and is connected between the CRC generator 210 and the memory core 21 of the memory module 20.

The CRC generator 210 is preset at its reset input interface by the address signal ADD pre-stored in the address register 220.

According to one operation scheme of the embodiment the address signal is associated to one data signal block wherein one signal frame includes one data signal block and one corresponding address signal so that the address register 220 of the CRC calculator 100 in the memory controller module 10 as well as the address registers 220 of the CRC calculator 200 in the memory module 20 each pre-store the address signal associated to the corresponding block of data signals. The pre-stored address signal ADD is supplied to the reset input interface RES of CRC generators 110 and 210 of the CRC calculator 100 and the CRC calculator 200, respectively.

Alternatively, the address signal ADD pre-stored in the address registers 120, 220 may be supplied at arbitrary points of time and not in any case at the reset time of the CRC generators 110, 210.

According to the present embodiment of the memory system the CRC calculator 100, 200 are included in both the memory controller 10 and the memory module 20. The example of such a memory system depicted in FIG. 1 may be a graphic memory system mostly standardized according to the GDDR5 standard mentioned above, wherein at least the memory controller module 10 may comprise only one memory controller chip. The memory module 20 may comprise one or more GDDR5 memory chips.

Figure 2:
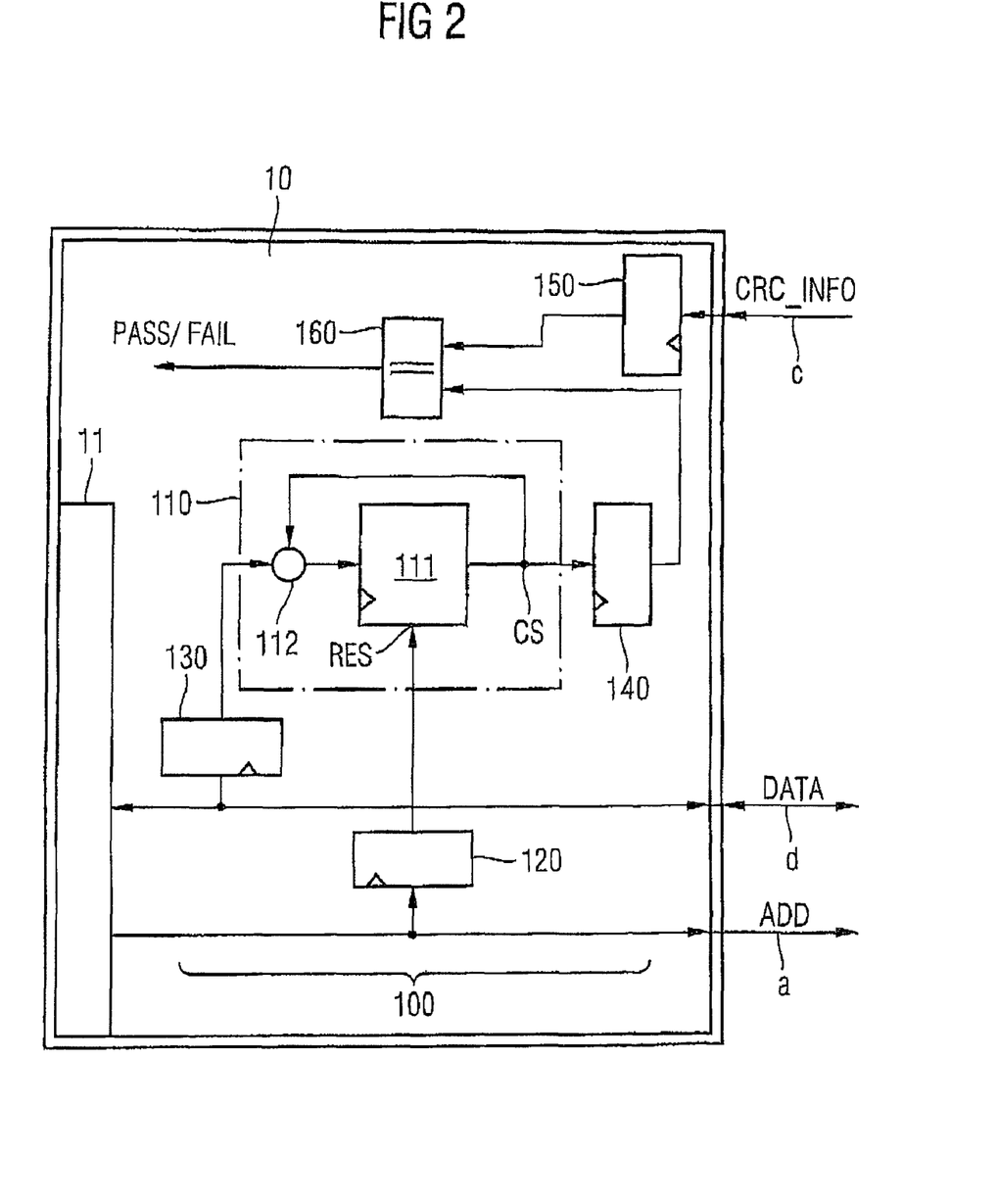
FIG. 2 shows schematically a functional block diagram of a memory controller module embodying a CRC calculator.

A further embodiment of the invention as schematically shown in FIG. 2 relates to a memory controller 10 which includes cyclic redundancy check (CRC) calculator 100 configured to calculate a CRC error recognition checksum for at least one block of data and address signals to be transferred within at least one signal frame between the memory controller and a memory module, the CRC calculator 100 including an address register 120 configured to pre-store an address signal ADD associated to a corresponding at least one block of data signals to be transferred, and a CRC generator 110 being configured to calculate the CRC error recognition checksum upon being initiated by the pre-stored address.

In this further embodiment the memory controller module 10 may comprise one controller chip, and the details of the CRC calculator in the memory controller 10 may be identical with these of the CRC calculator 100 included in the memory controller 10 according to FIG. 1.

Figure 3:
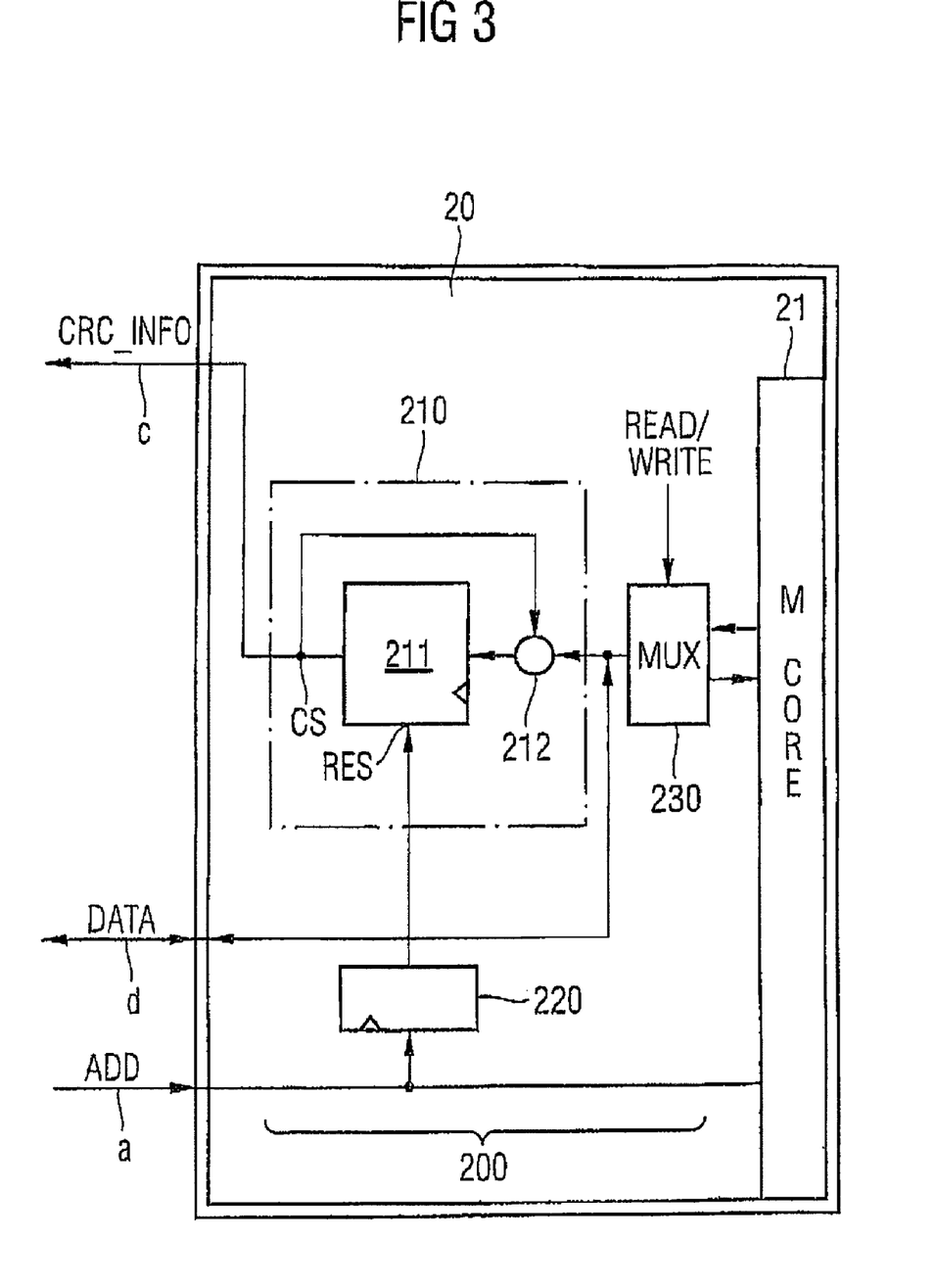
FIG. 3 shows schematically a functional block diagram of a memory module embodying a CRC calculator.

A further embodiment of the present invention as schematically shown in FIG. 3 relates to a memory module 20 which includes cyclic redundancy check (CRC) calculator 200 configured to calculate a CRC error recognition checksum for at least one block of data and address signals transferred within at least one signal frame between the memory module and for example a memory controller, the CRC calculator 200 including an address register 220 configured to pre-store an address signal ADD associated to a corresponding at least one block of data signals to be transferred, and a CRC generator 210 being configured to calculate the CRC error recognition checksum upon being initiated by the pre-stored address, wherein the memory module 20 of this further embodiment may comprise one memory chip for example standardized according to the GDDR5 standard, and the details of the CRC calculator 200 included in the memory module 20 according to this embodiment may be identical with these of the CRC calculator 200 included in the memory module 20 according to FIG. 1.

A memory system of the embodiment according to FIG. 1 carries out functional steps of error-securing blocks of data and address signals transferred within signal frames between the memory controller and the memory module, which comprise the steps of pre-storing an address signal associated to at least one block of data signals to be transferred, calculating a cyclic redundancy check (CRC) sum for the at least one data signal block to be transferred, wherein the pre-stored address signal is used as an initiation value for the calculation of the CRC sum and the at least one block of data and address signals are transferred together with the calculated CRC sum.

The address signal may be unique for one data signal block and the address and the data signal block may be included in one signal frame.

According to an advantageous development the calculated CRC sum is compared with a reference CRC sum and a pass/fail signal according to the comparison result is output.

In case the memory controller carries out this comparison and outputs the pass/fail signal, the calculated CRC sum which is used as the reference CRC sum is transferred together with at least one error secured block of data and address signals from the memory module to the memory controller.

These functional steps may be similarly carried out for write data blocks and read data blocks.

In a memory system of that kind which comprises a memory controller and a memory module which are according to FIG. 1 configured for transferring blocks of data and address signals within signal frames between the memory controller and the memory module, the present invention according to a further embodiment carries out functional steps of calculating a cyclic redundancy check (CRC) sum for at least one block of data and address signals to be transferred within at least one signal frame, wherein an address signal associated to a corresponding at least one block of data signals to be transferred is pre-stored and used as an initiation value for calculating the CRC sum.

In this cyclic redundancy checksum calculating scheme, the address may be unique for one data signal block which may be included in one signal frame. Further the memory module may output a calculated CRC sum as a reference CRC sum which may be compared with a calculated CRC sum of the memory controller, and the memory controller may output a pass/fail signal according to the comparison result. Also these functional steps of this embodiment may be carried out for write data and read data blocks.

Figure 4:
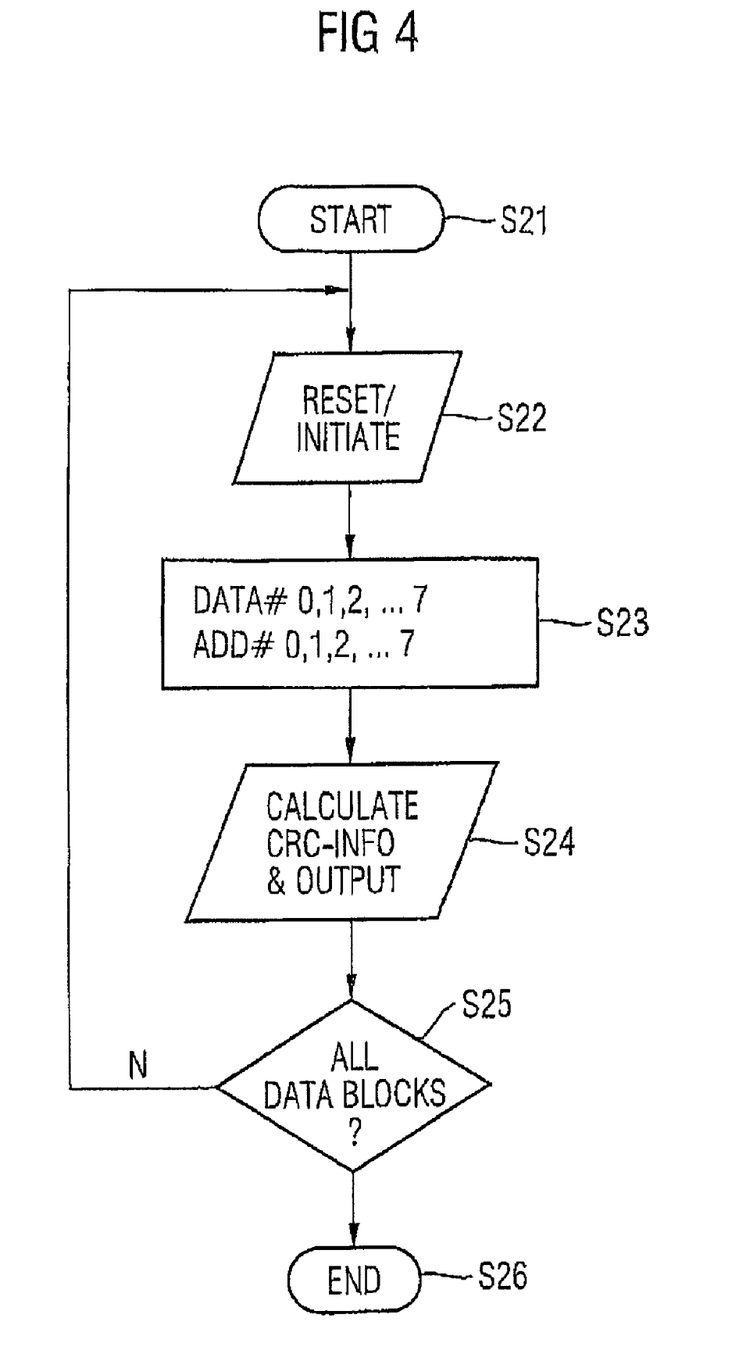
FIG. 4 schematically shows a flow chart of method steps for carrying out the cyclic redundancy check error detection in the memory module, FIG. 5 schematically shows a flow chart of method steps for carrying out the cyclic redundancy check error detection in the memory controller module.

FIG. 4 schematically shows a flowchart of steps carried out for calculating the CRC error recognition checksum that is transferred as the CRC_INFO signal by the CRC calculator 200 in the memory module 20. The CRC_INFO signal is transferred through the lines c to the CRC info buffer 150 of the CRC calculator 100 of the memory controller 10 and used as the reference CRC checksum for being compared with the CRC checksum calculated by the CRC calculator 100 of the memory controller 10.

After start in step S21, the calculator register 211 of the CRC generator 210 is reset (S22) by applying the address information pre-stored in the address register 220. At the same time a first data block, for example a data block 0 is supplied to the CRC generator 210 through the data multiplexer 230 (step S23). Thereupon in step S24 the CRC generator 210 calculates the CRC checksum CS which is output from the memory module 20 as the CRC info signal through the lines c to be used as the reference CRC checksum for the comparator 160 included in the memory controller 10.

According to step S25 when the CRC checksum for all data blocks are calculated, the control flow goes to the end (step S26). Otherwise the process returns to step S22 and the CRC checksum for the next data item is calculated. That is, for each data block #0, 1, 2, ... the CRC calculator register 111 is reset by the pre-stored address signal corresponding to the respective data item and held in the address register 220. The CRC checksum CS is again calculated.

Figure 5:
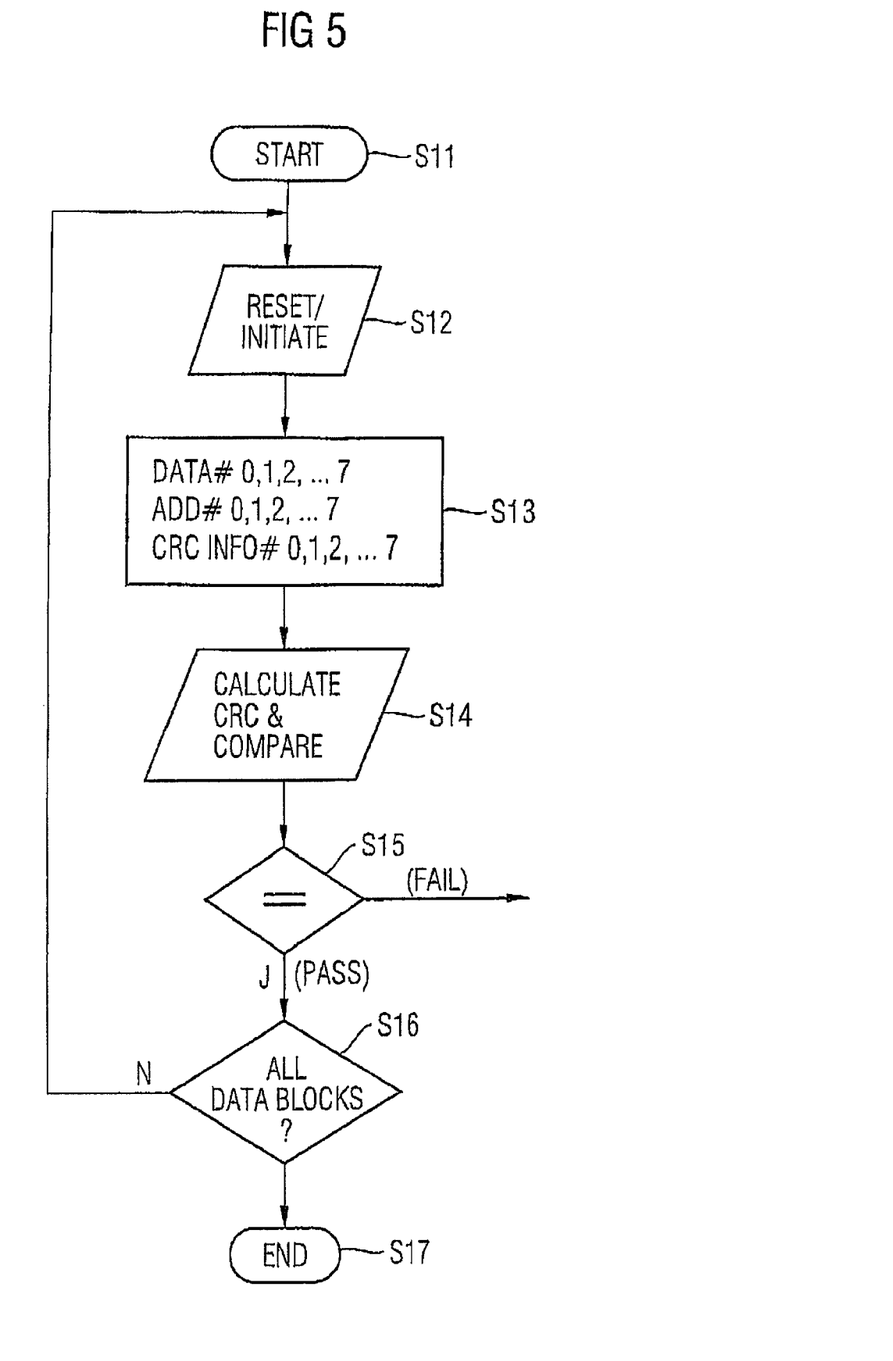

FIG. 5 depicts a flowchart of process steps S11-S17 carried out for calculating the CRC checksum by the CRC calculator 100 in the memory controller 10. While steps S11, S12, S13, S16 and S17 in the process steps depicted in FIG. 3 are respectively similar to the process steps S21, S22, S23, S25 and S26 in the flowchart of FIG. 2, the process steps S14 and S15 carry out the comparison of the CRC checksum CS calculated by the CRC generator 110 of the memory controller 10 and temporarily stored in the CRC output register 140 with the reference CRC checksum stored in the CRC info buffer 150 by the comparator 160 (S14) and the output of the pass/fail signal (S15).

Figure 6:
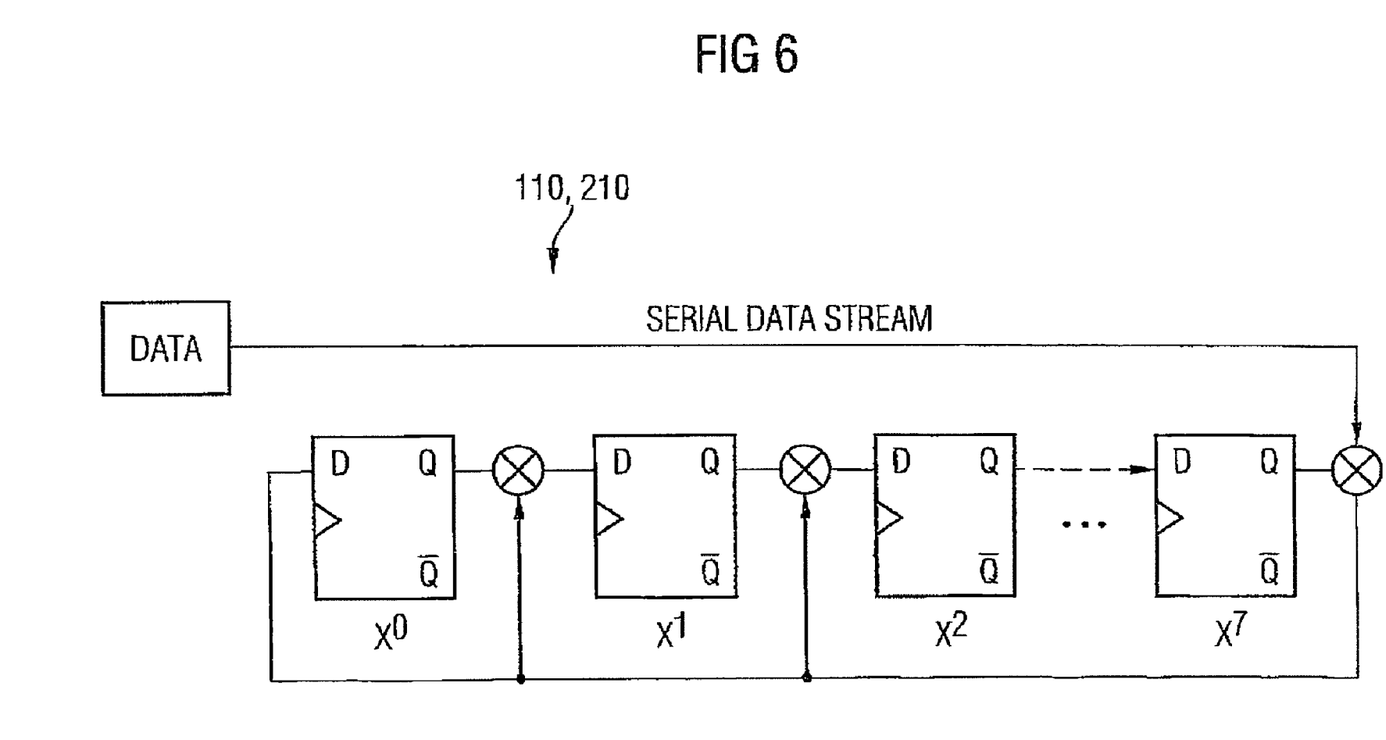
FIG. 6 shows an example of a circuit construction of a CRC-generator which may be used in the CRC calculator in the memory controller module and the memory module.

FIG. 6 shows an example of a circuit construction of a CRC generator which may be used as the CRC generators 110 and 210 in the CRC calculator 100 and 200. Both CRC generators 110 and 210 respectively might have the identical circuit construction and use the identical polynomial expression for the calculation of the CRC checksum. The example in FIG. 4 is simplified since actually the CRC generators 110, 210 calculate the CRC checksum in parallel for a predefined number of data bits (for example 72 bits=9 channels×8 bit burst).

Via the pass/fail signal output by the comparator 160 of the CRC calculator 100, the controller 10 can decide if the data and address (or the CRC_INFO signal returned from the memory module) was erroneously transmitted and retry the read or write command. In this embodiment no error correction is carried out in the memory module 20.

In the present memory system, the reset input of the CRC generator 110, 210 of the memory controller 10 and the memory module 20 is preset by the address value which is associated to the transferred data block (read and write) and which is pre-stored in the address register 120, 220, respectively. This measure ensures recognition of any errors in each data block and also in the associated address signal. This CRC error recognition according to the present memory system therefore can be realized without additional pins at the memory module and the memory controller. Likewise this CRC error recognition method provides a unique protocol for the error processing in the GDDR5 standard.

The present memory system also provides a solution to supply the address signal at any appropriate time point which may not be identical with the reset time and thereby guarantees a secure transfer of not only the data items but also the corresponding address.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. A memory system comprising:
a memory controller; and
a memory module, wherein at least one of the memory controller and the memory module includes a cyclic redundancy check (CRC) calculator configured to calculate a CRC error recognition check sum for at least one block of data and address signals to be transferred within at least one signal frame between the memory controller and the memory module, the CRC calculator including:
an address register configured to pre-store an address signal associated with a corresponding at least one block of data signals to be transferred; and
a CRC generator configured to calculate the CRC error recognition check sum in response to being initiated by the pre-stored address signal.

2. The memory system of claim 1, wherein the address signal is associated with one data signal block.

3. The memory system of claim 2, wherein one signal frame includes one block of data and address signals.

4. The memory system of one of claims 2, wherein the address register is further configured to store the address signal.

5. The memory system of claim 1, wherein:
the CRC calculator further includes a data input register configured to temporarily store at least one block of data signals associated with the address signal pre-stored in the address register and to input the at least one block of data signals to the CRC generator; and the CRC generator comprises an initial value setting unit configured to initially set the CRC generator to an initial value corresponding to the address signal pre-stored in the address register.

6. The memory system of claim 5, wherein the CRC calculator further comprises an output register configured to store the calculated CRC check sum.

7. The memory system of claim 6, wherein the CRC calculator further comprises a comparator configured to compare the calculated CRC check sum stored in the output register with a reference CRC check sum and output a pass/fail signal according to the result of the comparison.

8. The memory system of claim 1, wherein the CRC calculator is embodied in the memory module.

9. The memory system of claim 8, wherein the memory module comprises at least one semiconductor memory chip.

10. The memory system of claim 8, wherein the memory module comprises at least one DDR 5 semiconductor memory chip.

11. The memory system of claim 1, wherein the CRC calculator is embodied in the memory controller and the memory module.

12. A memory controller, comprising:
a cyclic redundancy check (CRC) calculator configured to calculate a CRC error recognition check sum for at least one block of data and address signals to be transferred within at least one signal frame between the memory controller and a memory module, the CRC calculator comprising:
an address register configured to pre-store an address signal associated with a corresponding at least one block of data signals to be transferred; and
a CRC generator configured to calculate the CRC error recognition check sum in response to being initiated by the pre-stored address signal.

13. The memory controller of claim 12, wherein the address signal is associated with one data signal block.

14. The memory controller of claim 13, wherein one signal frame includes one block of data and address signals.

15. The memory controller of one of claims 13, wherein the address register is further configured to store the address signal.

16. The memory controller of claim 12, wherein the CRC calculator further includes:
a data input register configured to temporarily store at least one block of data signals associated with the address signal pre-stored in the address register and to input the at least one block of data signals to the CRC generator; and
the CRC generator comprises an initial value setting unit configured to initially set the CRC generator to an initial value corresponding to the address signal pre-stored in the address register.

17. The memory controller of claim 16, wherein the CRC calculator further comprises an output register configured to store the calculated CRC check sum.

18. The memory controller of claim 17, wherein the CRC calculator further comprises a comparator configured to compare the calculated CRC check sum stored in the output register with a reference CRC check sum and output a pass/fail signal according to the result of the comparison.

19. A memory module, comprising:
a cyclic redundancy check (CRC) calculator configured to calculate a CRC error recognition check sum for at least one block of data and address signals transferred within at least one signal frame between the memory module and a memory controller, the CRC calculator comprising:
an address register configured to pre-store an address signal associated with a corresponding at least one block of data signals to be transferred; and
a CRC generator configured to calculate the CRC error recognition check sum in response to being initiated by the pre-stored address signal.

20. The memory module of claim 19, wherein the address signal is associated with one data signal block.

21. The memory module of claim 20, wherein one signal frame includes one block of data and address signals.

22. The memory module of one of claim 20, wherein the address register is configured to store the address signal.

23. A method of error-securing blocks of data and address signals transferred within signal frames between a memory controller and a memory module of a memory system, the method comprising:
pre-storing an address signal associated with at least one block of data signals to be transferred;
calculating a cyclic redundancy check (CRC) sum for the at least one data signal block to be transferred, wherein the pre-stored address signal is used as an initial value for the calculation of the CRC sum; and
transferring the at least one block of data and address signals together with the calculated CRC sum.

24. The method of claim 23, wherein the address signal is associated with one data signal block.

25. The method of claim 24, wherein one signal frame includes one block of data and address signals.

26. The method of claim 25, further comprising:
comparing the calculated CRC sum with a reference CRC sum and outputting a pass/fail signal according to the result of the comparison.

27. The method of claim 23, wherein the at least one error-secured data and address signal block is transferred together with the calculated CRC sum from the memory module to the memory controller.

28. The method of claim 23, wherein the method is carried out for at least one of write data and read data.

29. A method of calculating a cyclic redundancy check (CRC) sum for at least one block of data and address signals to be transferred within at least one signal frame between a memory controller and a memory module of a memory system, the method comprising:
pre-storing an address signal associated with a corresponding at least one block of data signals to be transferred; and
using the pre-stored address as an initial value for calculating the CRC sum.

30. The method of claim 29, wherein the address signal is associated with one data signal block.

31. The method system of claim 30, wherein one signal frame includes one block of data and address signals.

32. The method of claim 31, further comprising:
comparing a calculated CRC sum with a reference CRC sum and outputting a pass/fail signal according to the result of the comparison.

33. The method of claim 29, wherein the method is carried out in the memory module.

34. The method of claim 29, wherein the method is carried out in the memory controller and the memory module.

35. The method of claim 29, wherein the method is carried out for at least one of write data and read data.

* * * * *